Jan. 13, 1970  F. BRUMME ET AL  3,489,310
PRESSURE VESSELS

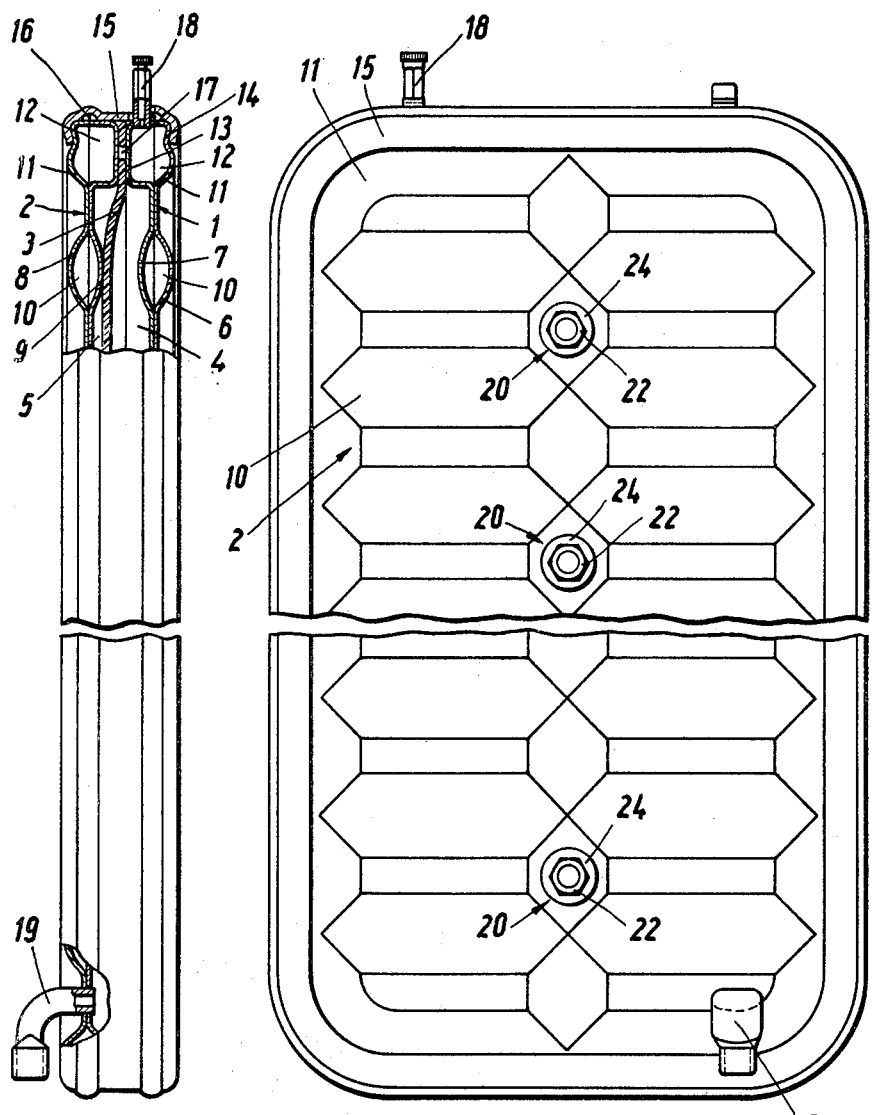

Filed Dec. 13, 1967  2 Sheets-Sheet 2

Inventors:
Fritz Brumme
Horst Böhne
by Michael S. Striker
Attorney

United States Patent Office 3,489,310
Patented Jan. 13, 1970

3,489,310
PRESSURE VESSELS
Fritz Brumme, Raunheim, Hesse, and Horst Böhme, Russelheim (Main), Germany, assignors to Effbe-Werke Fritz Brumme K.G., Raunheim, Hesse, Germany
Filed Dec. 13, 1967, Ser. No. 690,225
Claims priority, application Germany, Mar. 2, 1967,
E 33,501
Int. Cl. B65d 7/12, 7/46
U.S. Cl. 220—5
17 Claims

ABSTRACT OF THE DISCLOSURE

A pressure vessel having two enclosing walls separated from each other by a membrane member. A fastening device passing through the membrane member holds the enclosing walls together and separated from each other at a predetermined distance. The enclosing walls and the membrane member form two sealed chambers on opposite sides of the membrane member so as to be able to confine fluids under pressure. The fastening device is constructed to assure that the chambers are effectively sealed and isolated from each other so as to be able to contain different fluids under pressure. The more the fastening device is tightened, the greater is the sealing effect.

BACKGROUND OF THE INVENTION

Pressure vessels are known in the art which are assembled of two sections in the form of semi-shells having a ribbed base. The ribbed design is determined on the basis that it is a function of the diameter and the prevailing pressure. The separating distance between the bases of the two semi-shells of the pressure vessel, can, therefore, not be smaller than a predetermined value. If an attempt is made to make the bases flatter or even parallel with respect to each other, then no substantial pressure can be sustained.

It is an object, accordingly, of the present invention to provide a pressure vessel with a membrane which extends through a relatively small distance in at least one direction without affecting the pressure resistance capability of the vessel. The object is achieved through the present invention by providing that the retaining walls on both sides of the membrane be secured together by means of a unique fastening arrangement.

The fastening arrangement is designed to impart to both retaining walls a substantial increase in thickness. The membrane itself is prevented from moving freely or flexing, through the fastening arrangement. This, however, is of little significance. It is relatively seldom when, in the usual application, the membrane completely abuts against a retaining wall. Furthermore, the design of the present invention provides that a substantially small separation prevails between the walls of the pressure vessel. The deflection of the membrane is therefore limited to substantially small distances, and the inhibition of the freedom of motion of the membrane at individual points is of no disadvantage. Lastly, the membrane can be designed that it may freely flex over its entire surface, in spite of the fastening arrangement. Thus, the design may be such that a ring-shaped section surrounds the entire fastening arrangement.

The present invention is adaptable for reinforcing of those pressure vessels already known in the art, as well as newly designed pressure vessels. The present invention is particularly applicable to those cases in which the retaining walls are substantially parallel and the pressure vessels are considerably thin. In order to retain the number of fastening arrangements on devices at a minimum, the retaining walls may also be stiffened through identations.

In accordance with a well known design, the retaining walls are designed in the form of two shells which are webbed or ribbed in opposite directions. Hollow spaces prevail between the prevailing indentations. Through the stiffening of the retaining walls achieved in this manner, the pressure vessels may be produced of relatively thin design. If now the fastening device in accordance with the present invention is applied the pressure vessels may be made still thinner. This results from the condition that the indentations need not extend as far to the exterior as previously in order to realize a predetermined stiffness.

In its simplest design, the fastening arrangement consists of one of the two retaining walls and a bolt through the membrane. The bolt is provided with a nut at the other side. Through compression of the retaining walls, or through the pressure prevailing within the vessel, the two walls become pressed against the bolt head and the nut. In a preferred embodiment, the fastening arrangement is comprised of a spacer in the form of a sleeve which has an internal thread. In this manner a permanent and well defined mechanical coupling is realized between both retaining walls.

For purposes of firmness it is desirable that the fastening arrangement be surrounded by an elastic sleeve which becomes pressed against the retaining walls when the fastening device is applied. With this design assurance is obtained that the spaces on both sides of the membrane do not come into contact with each other or with the atmosphere.

Since the membrane is also made of elastic material, the sleeve is constructed integral with the membrane in one particular simple design of the present invention. In lieu of this arrangement the sleeve can also be subdivided into two cylindrical parts which grip the membrane securely when the fastening device is applied.

In one embodiment the sleeve is compressed 40% when the arrangement is fully assembled. The resulting pressure at the two retaining walls assures that a completely leakage tight arrangement is realized.

In order to maintain the walls of the pressure vessel at the proper spacing even around the edge and properly connected to each other, it is desirable to provide the retaining walls with a toroidal-shaped rim. This rim has an inner clamping surface for clamping the membrane and at the exterior it has preferably a clamping surface inclined towards the interior. A tension ring having preferably a U-shaped cross section grips across the outer clamping surface. The terminal sections of the tension ring are pressed towards the interior so that they follow the contour of the external clamping surface and cannot again be removed therefrom. When using walls made of two shells, it is desirable, in this regard that the shells be secured together at the edge or rim through a weld made in a protective atmosphere. This weld can be carried out in relatively simple form since no severe requirements are imposed upon it. The weld is required to be essentially only a sealing agent, and does not have to resist applied pressures. This is because the tension ring provides sufficient stiffness for this purpose.

SUMMARY OF THE INVENTION

A pressure vessel which has two enclosing walls and a membrane member located between them. The membrane member and the two enclosing walls form two separate sealed chambers on opposite sides of the membrane. The two enclosed walls are held together at a predetermined distance from each other through a fastening device which passes through the membrane member. The fastening device is designed to effectively seal the opening through which it passes in the membrane member and thereby maintain the two chambers sealed. The construction of the fastening device is such that the more it is fastened the higher is the sealing pressure. The combination permits the two isolated and sealed chambers to contain different fluids under pressure.

The novel features which are considered as characteristic for the invention are set forth in particular in the appended claims. The invention itself, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an elevational view of the pressure vessel, in accordance with the present invention;

FIG. 2 is a side view of the pressure vessel of FIG. 1 and shows partially a cross-sectional view of the interior thereof;

DESCRIPTION OF THE PREFERRED EMBODIMENTS

Figure 3:
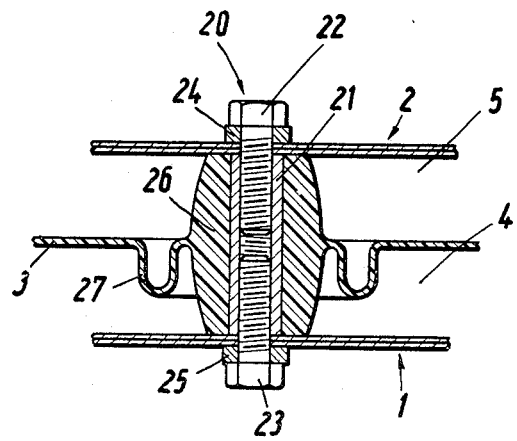
FIG. 3 is a cross-sectional view of one embodiment of the fastening device used to secure together the enclosing walls of the pressure vessel.

Referring to the drawing, the pressure vessel has two parallel walls 1 and 2. A membrane 3 is arranged between the walls 1 and 2. A pressure space prevails on both sides of the membrane 3. One such pressure space 4 is for pressurized gas, whereas the other pressure space 5 is intended for water. The wall 1 has two shell frames 6 and 7, while the wall 2 has two such shell frames 8 and 9. The interior shell frames are provided with identations curving toward the interior, whereas the outer shell frames are provided with indentations curving toward the exterior. As a result of these curved indentations, the hollow spaces 10 are generated in parallel and longitudinally. This particular construction provides for increased stiffness of each wall. A collar 11 surrounds each shell frame and encloses a space 12. The collar possesses a clamping surface 13 at its inner side or face for purposes of securely clamping the membrane 3. At its outer side, the collar has a clamping surface 14 which is oriented towards the interior by an angle of approximately 15 degrees. Both of the collars as shown in FIG. 2, are held together through a rim 15. The shell frames can be secured together through a simple weld 16 made in a protective atmosphere. The weld must be dense and little effected by pressure.

The hollow spaces 10 and 12 adjoin the pressurized gas space 4. An opening 17 in the membrane is provided whereby the size of the pressurized gas space is increased without requiring additional room. Through the connection 18, the pressurized gas space may be filled. The water space 5, on the other hand, may be filled through the connection 19 which may lead to a heating facility or the like.

Figure 4:
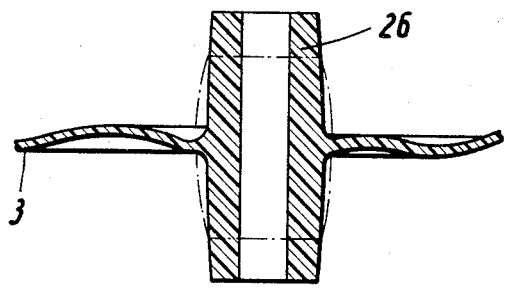
FIG. 4 is a cross-sectional of a portion of the membrane member used to form sealed chambers within the pressure vessel.
Figure 5:
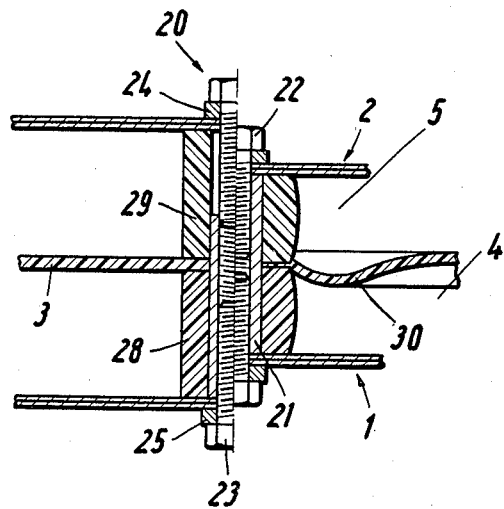
FIG. 5 is a cross-sectional view of another embodiment of the fastening arrangement used to assemble the enclosing walls of the pressure vessel and the membrane member therein, in accordance with the present invention.

Along the longitudinal center line of the pressure vessel, the walls 1 and 2 are secured together through a plurality of fastening devices 20. FIGS. 3 to 5 show examples of possible embodiments for these fastening devices.

A spacing sleeve 21 is placed between the walls 1 and 2 in FIG. 3. The sleeve has an internal thread to accommodate the screws 22 and 23. Washers 24 and 25 are provided beneath the heads of the screws. A hub-shaped member 26 is pushed over the sleeve 21 and pressed into close contact therewith when the fastening device 21 to 25 is properly secured. In that case, the hub 1 and 2 abuts firmly against both walls 1 and 2. The hub-shaped member or sleeve 26 is integrally constructed with the membrane 3. The membrane 3 is formed to include a U-shaped ring 27 surrounding the immediate vicinity of the hub-shaped member 26. In this manner, the flexibility of the membrane is not affected or interfered with by the fastening device arrangement.

FIG. 4 shows an embodiment with an elastic hub 26 which is illustrated when in the unstressed state. The dash-dot line in the drawing of FIG. 4, shows the extent to which the hub may be compressed when in use. Thus, a compression or reduction of 40%, for example, is possible. The membrane 3 connects directly to the hub 26. This arrangement is adequate in many cases since no large movements of the membrane are required.

FIG. 5 shows another embodiment of the fastening device before and after assembly, by the left and right hand portions of the diagram, respectively. The elastic hub member is subdivided into two cylindrical parts 28 and 29. The membrane 3 is securely held between the cylindrical parts 28 and 29. Such design of the hub in which it is subdivided into two separate parts is of advantage when the membrane is of special construction and has, for example. reinforcing ribs or material of other elasticity. When the fastening device has been applied and the hub has been, accordingly, compressed, the membrane experiences a deformation adjoining the compressing location. This deformation results in a curve-shaped zone 30 surrounding the compressed or stressed area. As a result, movement of the membrane is made possible without any additional means.

Instead of the screws shown, the walls may also be secured through such fastening means as soldering, welding or the like. It is also possible to maintain the membrane tightly pressed against the fastening device and to provide additional pressure application at the passage of the fastening device through both walls. When the membrane is still more securely clamped between the parts 27 and 28, shown in FIG. 5, it is possible to provide both sides of the membrane with a ring constructed of, for example, concentric circular indentations made of sheet metal.

It will be undesrtood that each of the elements described above, or two or more together, may also find a useful application in other types of pressure vessel constructions differing from the types described above.

While the invention has been illustrated and described as embodied in pressure vessel construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

We claim:

1. A pressure vessel comprising, in combination, two opposite enclosing walls; a membrane member located between said two opposite enclosing walls secured along its edge to the same and forming with said opposite enclosing walls two sealed spaces on opposite sides of said membrane member, said membrane member having an opening spaced from said edge thereof; at least one elongated fastening means extending transversely through said opening in said membrane member, said fastening means fastening said two enclosing walls to each other spaced from said edge of said membrane member and at a predetermined distance from each other; and elastic sealing means surrounding said elongated fastening means and having in direction of elongation of said elongated fastening means in uncompressed state a first length greater than said predetermined distance and being compressed to a second length corresponding to said predetermined distance when surrounding said fastening means, said elastic sealing means sealingly abutting against said walls and also sealingly engaging said membrane member in the region of said opening therein.

2. A pressure vessel as defined in claim 1, said fastening means comprising screw means operatively associated with said two enclosing walls for fastening the same to each other at said predetermined distance.

3. A pressure vessel as defined in claim 2, said fastening said further comprising internally threaded spacing sleeve means intermediate said enclosing walls and extending through said opening, and said screw means engaging said enclosing walls extending through said spacing sleeve means in mesh with the internal threads thereof.

4. A pressure vessel as defined in claim 2, said fastening means further comprising spacing sleeve means extending through said opening from one to the other of said enclosing walls, and surrounding said screw means intermediate said walls.

5. A pressure vessel as defined in claim 4, wherein said elastic sealing means comprises an elastic hub.

6. A pressure vessel as defined in claim 5, wherein said elastic hub is integral with said membrane member.

7. A pressure vessel as defined in claim 5, wherein said elastic hub is of one piece with said membrane member.

8. A pressure vessel as defined in claim 5, wherein said elastic hub comprises two longitudinally aligned hub portions located at and abutting against opposite sides of said membrane member.

9. A pressure vessel as defined in claim 6, wherein said membrane member comprises an annular marginal zone surrounding said opening and being integral with said elastic hub.

10. A pressure vessel as defined in claim 9, wherein said annular marginal zone is of substantially U-shaped cross-section in direction transversely to the general plane of said membrane member.

11. A pressure vessel as defined in claim 9, wherein said annular marginal zone is arcuately curved in direction transversely to the general plane of said membrane member.

12. A pressure vessel as defined in claim 1, wherein said second length is smaller than said first length by a factor at most approaching one half of said first length.

13. A pressure vessel as defined in claim 1, wherein said second length is smaller than said first length by substantially 40% of the former.

14. A pressure vessel as defined in claim 1, and further comprising stiffening means provided on said enclosing walls.

15. A pressure vessel as defined in claim 14, said stiffening means being constituted by a plurality of recesses on one and corresponding projections on the other side of each of said enclosing walls.

16. A pressure vessel as defined in claim 1, said enclosing walls being parallel with one another, and said fastening means being operative for maintaining said enclosing walls in parallelism with one another.

17. A pressure vessel as defined in claim 1, wherein each of said enclosing walls comprises two abutting shells overyling one another and having juxtaposed abutting inner surfaces and outer surfaces which face away from one another; and further comprising stiffening means in form of a plurality of pairs of facing recesses each provided in one of said inner surfaces and corresponding projections extending from the respectively associated outer surfaces of said shells.

References Cited

UNITED STATES PATENTS

| | | |
|---|---|---|
| 1,963,675 | 6/1934 | Plainevaux. |
| 3,173,265 | 3/1965 | Bixby. |
| 3,275,418 | 9/1966 | Nee. |
| 3,347,406 | 10/1967 | Katzenmeyer _____ 220—22 |

FOREIGN PATENTS

| | | |
|---|---|---|
| 872,297 | 7/1961 | Great Britain. |
| 541,447 | 10/1955 | Belgium. |

GEORGE E. LOWRANCE, Primary Examiner

U.S. Cl. X.R.

220—22